United States Patent
Stapleton

(10) Patent No.: US 9,145,685 B2
(45) Date of Patent: Sep. 29, 2015

(54) PANEL MOUNTING BRACKET FOR STANDING SEAM ROOF AND RELATED METHODS

(71) Applicant: Kevin Stapleton, San Antonio, TX (US)

(72) Inventor: Kevin Stapleton, San Antonio, TX (US)

(*) Notice: Subject to any disclaimer, the term of this patent is extended or adjusted under 35 U.S.C. 154(b) by 6 days.

(21) Appl. No.: 14/056,209

(22) Filed: Oct. 17, 2013

(65) Prior Publication Data

US 2014/0109496 A1   Apr. 24, 2014

Related U.S. Application Data

(60) Provisional application No. 61/715,452, filed on Oct. 18, 2012.

(51) Int. Cl.
| | |
|---|---|
| *E04D 13/00* | (2006.01) |
| *E04D 13/14* | (2006.01) |
| *E04D 3/365* | (2006.01) |
| *F24J 2/52* | (2006.01) |

(52) U.S. Cl.
CPC ............ *E04D 13/00* (2013.01); *E04D 3/365* (2013.01); *E04D 13/1407* (2013.01); *F24J 2/5249* (2013.01); *F24J 2/5258* (2013.01); *Y02B 10/20* (2013.01); *Y02E 10/47* (2013.01)

(58) Field of Classification Search
CPC ..... E04D 13/1407; E04D 3/364; E04D 3/365; E04D 13/00; E04D 1/34; Y02B 10/20; Y02B 10/12; Y02B 10/47
USPC ........................................................ 52/173.3
See application file for complete search history.

(56) References Cited

U.S. PATENT DOCUMENTS

| | | | |
|---|---|---|---|
| 7,814,899 B1* | 10/2010 | Port ............................... | 126/623 |
| 7,963,074 B2 | 6/2011 | Schwarze et al. | |
| 8,251,326 B2* | 8/2012 | McPheeters ................ | 248/228.2 |
| 8,505,863 B2* | 8/2013 | McPheeters ................ | 248/228.2 |
| 8,627,617 B2* | 1/2014 | Haddock et al. ............. | 52/173.3 |
| 8,732,917 B2* | 5/2014 | Zeilenga et al. ................ | 24/569 |
| 8,794,583 B2* | 8/2014 | Poivet et al. .................. | 248/500 |
| 8,806,813 B2* | 8/2014 | Plaisted et al. ............... | 52/173.3 |
| 2010/0284737 A1* | 11/2010 | McPheeters ................ | 403/374.3 |
| 2011/0214366 A1* | 9/2011 | Haddock et al. ............. | 52/173.3 |
| 2011/0214367 A1* | 9/2011 | Haddock et al. ............. | 52/173.3 |
| 2012/0260977 A1 | 10/2012 | Stancel | |

(Continued)

OTHER PUBLICATIONS

"ACECLAMP Jr Technical Datasheet": pub 100602-1td V1.0 6/10 http://unirac.com/sites/default/files/aceclampdatasheetjune2010.pdf: 3 pgs.
"S-5 THe Right Way" http://www.s-5.com/home/index.cfm; 2 pgs, printed Oct. 17, 2013.

(Continued)

*Primary Examiner* — Elizabeth A Plummer
(74) *Attorney, Agent, or Firm* — Allen, Dyer, Doppelt, Milbrath & Gilchrist, P.A.

(57) ABSTRACT

A system is provided for mounting at least one solar panel on a roof having standing seams protruding outwardly therefrom. The system may include a plurality of panel mounting brackets each comprising first and second flanges laterally spaced apart to define a seam channel therebetween, with the seam channel for receiving a given standing seam therein when the first and second flanges are positioned on the roof straddling the given standing seam. Each panel mounting bracket may also include a vertical extension portion carried by the first and second flanges. The system may further include a plurality of clamps each configured to couple the vertical extension portion of a respective panel mounting bracket with the at least one solar panel.

24 Claims, 6 Drawing Sheets

(56) References Cited

U.S. PATENT DOCUMENTS

| | | | |
|---|---|---|---|
| 2013/0299657 A1* | 11/2013 | McPheeters | 248/237 |
| 2013/0313043 A1* | 11/2013 | Lallier | 182/45 |
| 2014/0102016 A1* | 4/2014 | Hemingway | 52/173.3 |

OTHER PUBLICATIONS

"S-5 The Right Way" http://www.s-5.com/clamps/index_1048.cfm: 1 pg, printed Oct. 17, 2013.

U.S. Appl. No. 14/279,799, filed May 16, 2014.

\* cited by examiner

PANEL MOUNTING BRACKET FOR STANDING SEAM ROOF AND RELATED METHODS

TECHNICAL FIELD

The present disclosure generally relates to mounting fixtures, and, more particularly, to mounting fixtures or brackets for panel installations, such as for solar panels, for example, to standing seam rooftops.

BACKGROUND

Solar panels, such as photovoltaic (PV) and solar water heating panels, are frequently used to take advantage of electrical power generation and heating properties of sunlight. To provide space savings and potentially enhanced efficiency, solar panels are in many cases installed on rooftops of buildings (e.g., office buildings, houses, etc.). However, because of winds and storms, the mounting fixtures used for installing solar panels on buildings need to be sufficiently strong and durable to reduce the chances of damage or injury from a panel coming loose during a storm, etc.

Various mounting fixtures have been developed for solar panel installation. For example, U.S. Pat. No. 7,963,074 discloses a device for fixing a photovoltaic module on a sloping roof having a roof structure and a roof covering with individual roof covering elements. The device includes a roof-side connecting piece disposable beneath the roof covering and a module-side connecting piece disposable on an edge of the photovoltaic module. A flexible retaining element interconnects the roof-side connecting piece and the module-side connecting piece. The flexible retaining element is loadable by pulling and adapted to be guided through the roof covering without altering a position or shape of the individual roof covering elements.

Despite the existence of such mounting fixtures, further enhancements may be desirable in some applications.

SUMMARY

A system is provided for mounting at least one solar panel on a roof having standing seams protruding outwardly therefrom. The system may include a plurality of panel mounting brackets each comprising first and second flanges laterally spaced apart to define a seam channel therebetween, with the seam channel for receiving a given standing seam therein when the first and second flanges are positioned on the roof straddling the given standing seam. Each panel mounting bracket may also include a vertical extension portion carried by the first and second flanges. The system may further include a plurality of clamps each configured to couple the vertical extension portion of a respective panel mounting bracket with the at least one solar panel.

More particularly, the seam channel may extend vertically into the vertical extension portion. Moreover, at least one adjustable locking mechanism may be carried by the vertical extension portion for contacting the given standing seam within the seam channel. For example, the at least one adjustable locking mechanism may comprise at least one set screw. In accordance with another example, at least one locking mechanism may be carried by the first flange for contacting the given standing seam within the seam channel (e.g., a locking cam(s)).

In some configurations, the at least one solar panel may comprises a pair of solar panels, and at least one of the clamps may be configured to couple the pair of solar panels to a same vertical extension portion. Each vertical extension portion may define a fastener channel therein, and the system may further include a respective fastener to be received within each fastener channel to couple each vertical extension portion with a respective clamp. The vertical extension portion may have one or more hollow channels therein. In addition, the vertical extension portion may be coupled to upper surfaces of the first and second flanges, and the system may further include a respective pad coupled to bottom surfaces of each of the first and second flanges opposite the upper surfaces.

A related panel mounting bracket, such as the one described briefly above, as well as a related method for mounting at least one solar panel on a roof having standing seams protruding outwardly therefrom, are also provided. The method may include positioning a plurality of panel mounting brackets on the roof overlapping the standing seams, with each panel mounting bracket including first and second flanges laterally spaced apart to define a seam channel therebetween. The seam channel may be for receiving a given standing seam therein when the first and second flanges are positioned on the roof straddling the given standing seam. Each panel mounting bracket may also include a vertical extension portion carried by the first and second flanges. The method may further include coupling the vertical extension portion of each panel mounting bracket with the at least one solar panel using a respective clamp.

DETAILED DESCRIPTION

Figure 1:
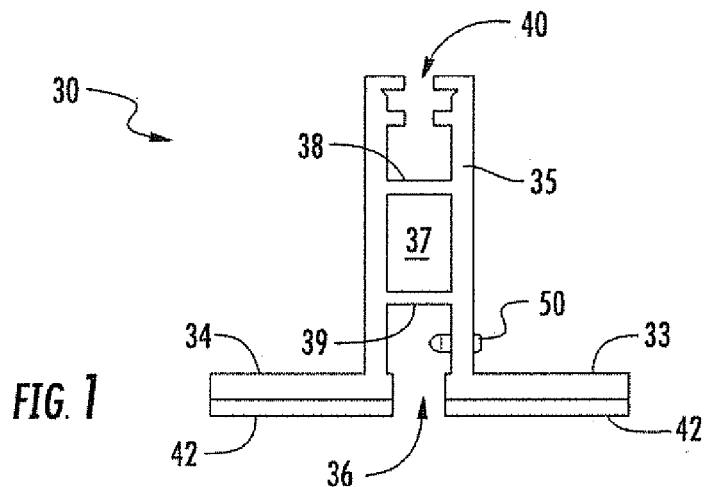
FIG. 1 is an end view of a panel mounting bracket in according with an exemplary embodiment of the invention including a set screw locking mechanism.
Figure 2:
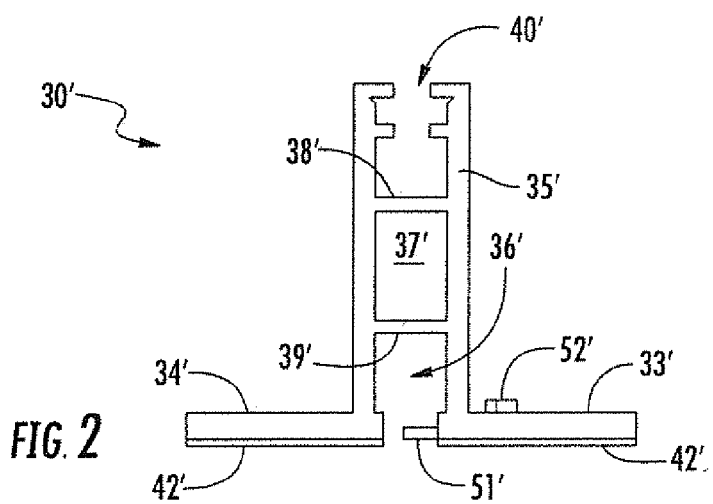
FIG. 2 is an end view of a panel mounting bracket in according with an alternative embodiment of the invention including a cam bolt locking mechanism.
Figure 3:
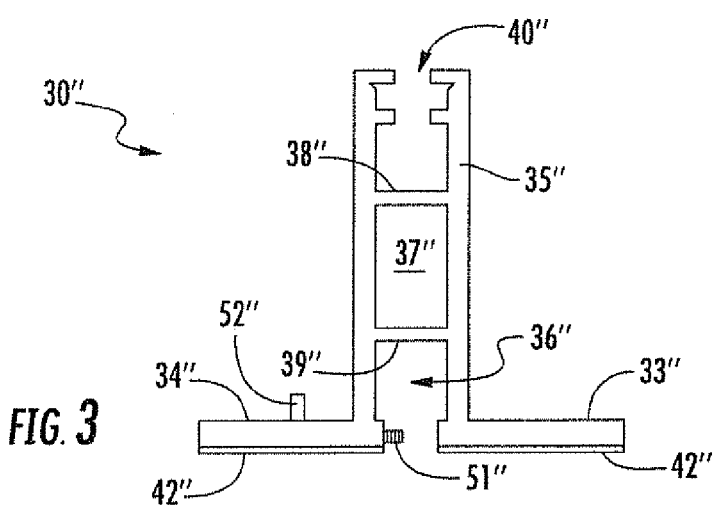
FIG. 3 is an end view of a panel mounting bracket in according with another alternative embodiment of the invention including a toothed locking cam mechanism.

The present description is made with reference to the accompanying drawings, in which exemplary embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements in different embodiments.

Referring initially to FIGS. 1-6, panel mounting brackets 30, 30', and 30" (which are each individually also referred to as a "foot" herein) for installing panels or modules, such as solar modules (e.g., photovoltaic or water heating modules), are first described. By way of background, solar modules or panels, particularly photovoltaic panels, are typically mounted to standing seam roofs 31, 31', 31" (e.g., standing seam metal roofs) with clamps that tighten against the seam 32, 32', 32" alone, but do not simultaneously rest on the flat portion of the metal roof.

The mounting brackets 30, 30', and 30" illustrated in FIGS. 1 through 6 advantageously have first and second extensions or flanges 33, 34; 33', 34'; 33", 34" which are set firmly against the flat portion of the seemed roof 31, 31', 31", so that a vertical extension portion 35, 35', 35" of the mounting brackets remains perpendicular to the roof without rotating or twisting or allowing the solar modules, when installed, to shift as with typical clamps that are only attached to the standing seam of the metal roof, as with the above-noted conventional clamps. The vertical extension portions 35, 35', 35" of the mounting brackets 30, 30', 30" are generally rectangular in the illustrated embodiments, and are centered between the first and second flanges 33, 34; 33', 34'; 33", 34" and extend upwardly therefrom. As such, the overall appearance of the mounting brackets 30, 30', 30" (from an end view) resembles an inverted "T", but other shapes or profiles may also be used in different embodiments.

The first and second flanges 33, 34; 33', 34'; 33", 34" extend laterally outward away from the seam 32, 32', 32" to provide a foot or base to set on the flat portions of the roofs 31, 31', 31" when a gap or seam channel 36, 36', 36" between the first and second flanges is positioned over a respective seam. In this way, the mounting brackets 30, 30', 30" straddle the respective standing seam 32, 32', 32". In the illustrated example, the seam channels 36, 36', 36" extend vertically up into the vertical extension portions 35, 35', 35", but in some embodiments relatively thick first and second flanges 33, 34; 33', 34'; 33", 34" may be used so that the seam channels do not extend into the vertical extension members, if desired.

The mounting brackets 30, 30', 30" may further include one or more adjustable locking mechanisms to help secure the mounting bracket to a given standing seam 32, 32', 32". In the example shown in FIGS. 1, 4, and 7-8, a pair of set screws 50 is carried by the vertical extension portion 35, which may be screwed inwardly to contact the standing seam 32 and thereby provide an adjustable amount of tension for holding the mounting bracket 30 securely in place. While the set screws are only shown on one side of the vertical extension portion 35, it should be noted that one or more screws 50 may also be used on the opposing side of the vertical extension portion as well (i.e., set screws may be used on both sides), if desired in some embodiments. Also, other number of screws 50 may also be used (e.g., a single screw or more than two screws).

In the example embodiments illustrated in FIGS. 2-3, 5-6, and 10-15, the adjustable locking mechanism is a locking cam mechanism housed within one (or both) of the first and second flanges 33', 34'; 33", 34". In the example of FIGS. 2, 5, and 10-12, the locking cam mechanism illustratively includes a locking cam 51' and a cam bolt 52' for adjusting the locking cam. Similarly, in FIGS. 3, 6, and 13-15, a toothed locking cam 51" and cam handle 52" are used. It should be noted that both locking cams and set screws (or other suitable locking mechanisms) may be used in some embodiments in combination. Moreover, in other embodiments, a locking mechanism may not be required, for example, if the seam channel 36, 36', 36" is sized to fit snug, or interlock, with the respective standing seam 32, 32', 32".

Generally speaking, the vertical height of the seam channels 36, 36', 36" may generally correspond with a height of the standing seams 32, 32', 32" on the given roof 31, 31', 31" where the installation is being performed, as will be appreciated by those skilled in the art. By way of example, this may typically be around one inch tall or less, although taller seam channels 36, 36', 36" may be used to accommodate taller seams 32, 32', 32" in different embodiments. In one example implementation, the bracket 30, 30', 30" may have an overall vertical height of about 3 inches, a width of about 3.375 inches, and the vertical extension portion 35, 35', 35" may have a width of about 0.875 inches, although these dimensions are merely exemplary and other dimensions and brackets sizes may be used in different embodiments.

In the illustrated examples, the vertical extension portions 35, 35', 35" have a respective central portions with a hollow central area or channel 37, 37', 37" therethrough defined by upper and lower cross-support members 38, 38', 38", and 39, 39', 39" for example. The central channel 37, 37', 37" may be used for routing electrical wires, etc., in some embodiments, if desired, although it should be noted that the central channel may be omitted in some embodiments (i.e., it need not be hollow), or that more than one such channel may be used, if desired.

Figure 7:
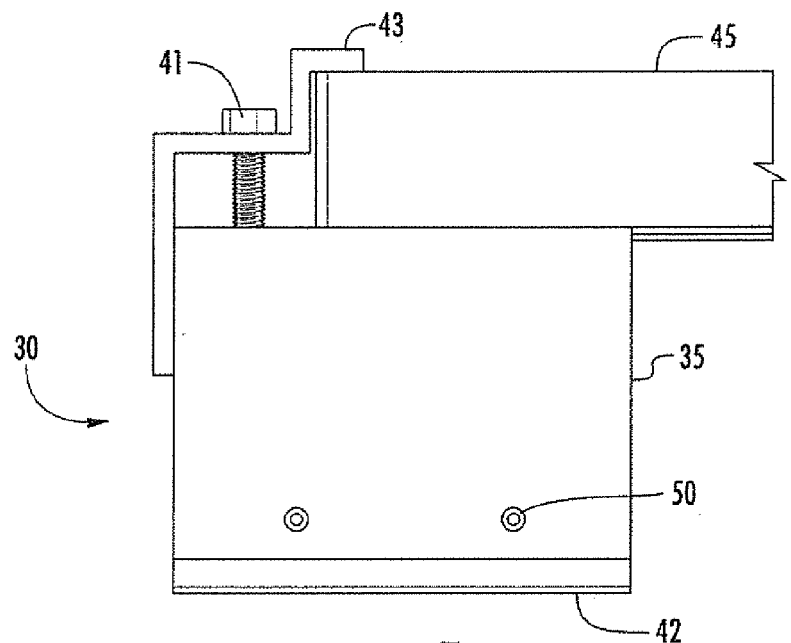
FIG. 7 is a side view of a solar panel installation with an end-clamp using the bracket of FIG. 1.
Figure 8:
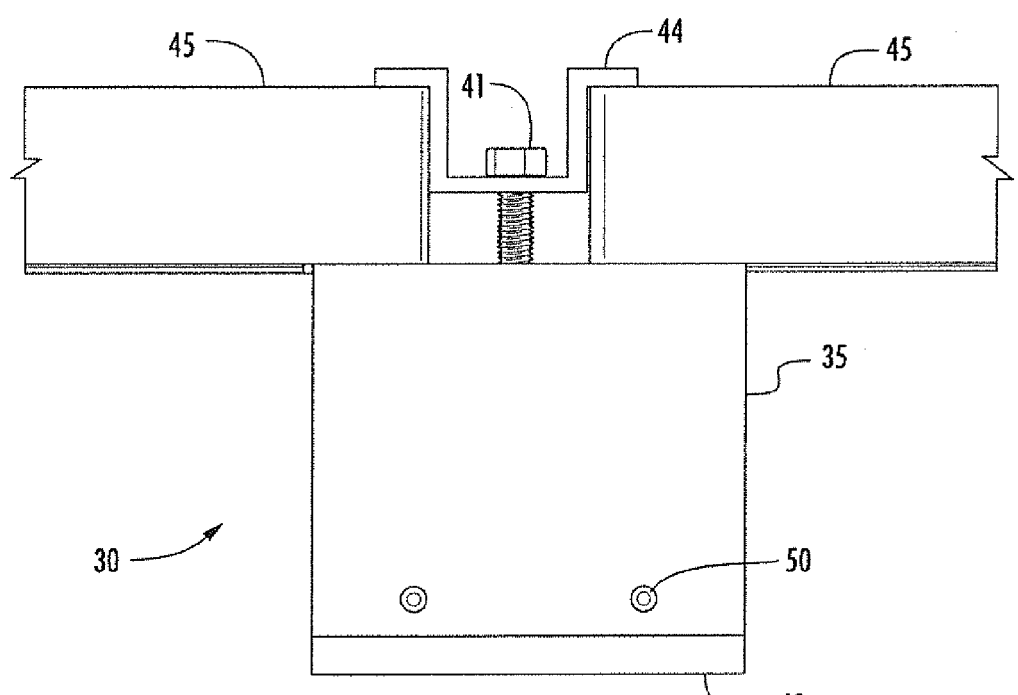
FIG. 8 is a side view of a pair of panels installed with a mid-clamp using the bracket of FIG. 1.

The vertical extension portions 35, 35', 35" have an upper slot or groove 40, 40', 40" for attaching a fastener such as a bolt (e.g., a hex head bolt) 41 and/or nuts (as seen in FIGS. 7-8) is provided on the tops thereof. As noted above, the first and second flanges 33, 34; 33', 34'; 33", 34" at the bottom of the mounting brackets 30, 30', and 30" extend outwardly away from the vertical extension portions 35, 35', 35" so as to sit flat on the rooftop 31, 31', 31" or roof deck upon installation. Serrations or other surface features may optionally be included on the tops and/or bottom surfaces of the first and second flanges 33, 34; 33', 34'; 33", 34", and/or on tops of the vertical extension portions 35, 35', 35", if desired. The serrations may advantageously provide for improved electrical grounding with the frame of the module, as well as increased grip or friction, for example. Pads 42, 42', 42" of rubber or other insulating material may optionally be included on the bottoms of the first and second flanges 33, 34; 33', 34'; 33", 34" to protect the standing seam metal roof from being damaged by the flanges, if desired.

Figure 4:
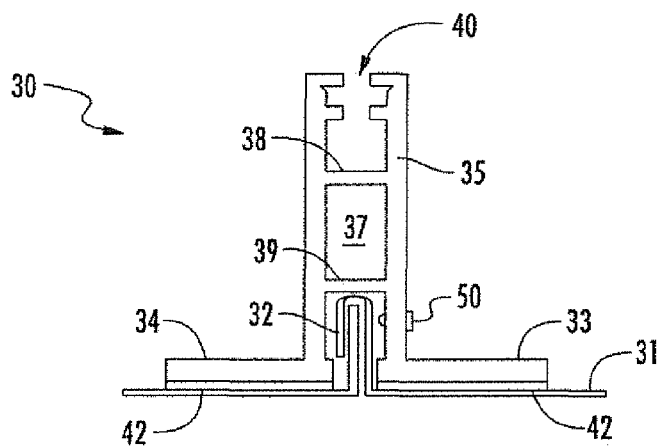
FIGS. 4-6 are end views illustrating the installation of the brackets of FIGS. 1-3, respectively, on a metal standing seam rooftop.
Figure 5:
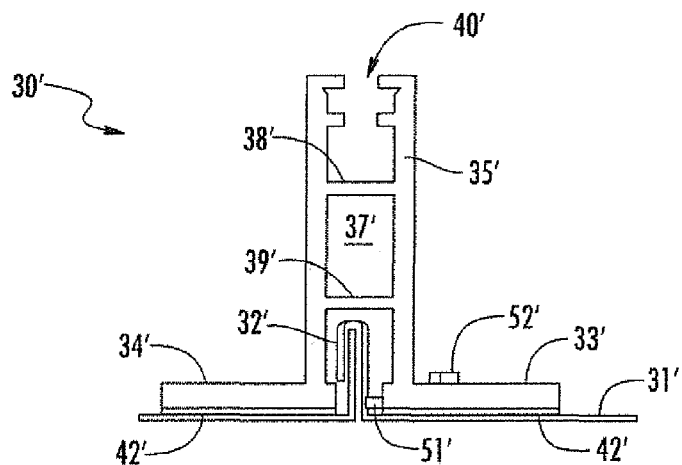
Figure 6:
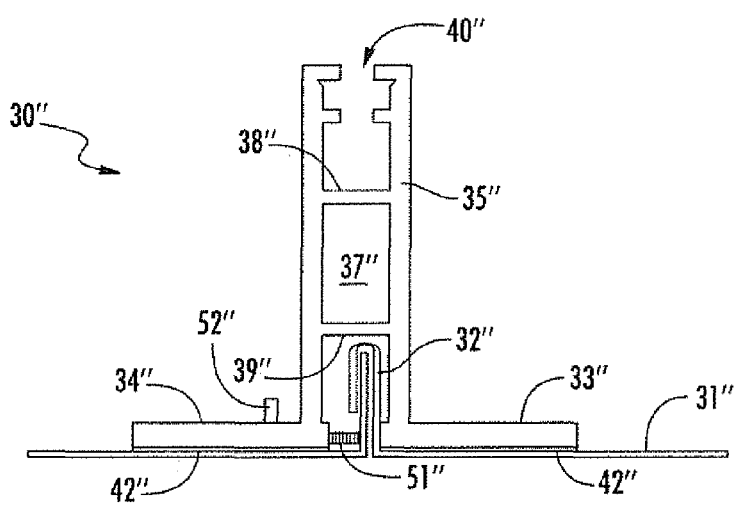
Figure 9:
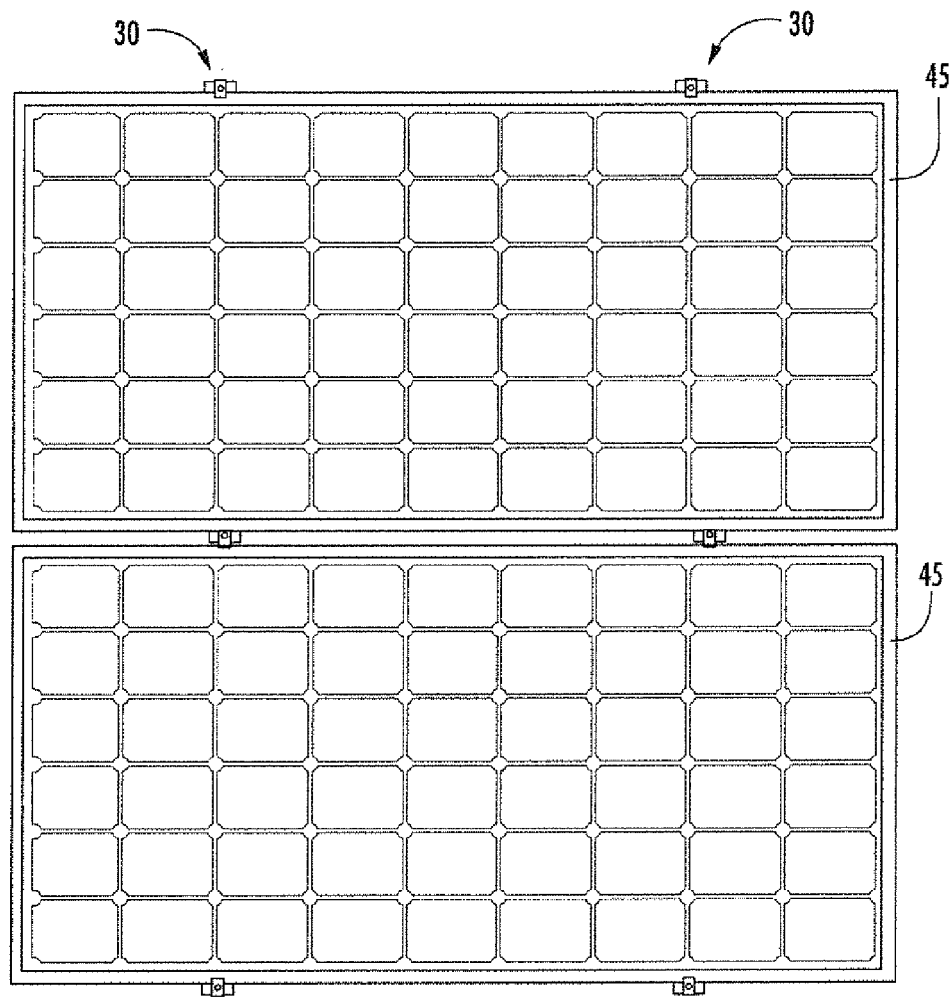
FIG. 9 is a top view illustrating an example solar panel installation using the bracket of FIG. 1.
Figure 10:
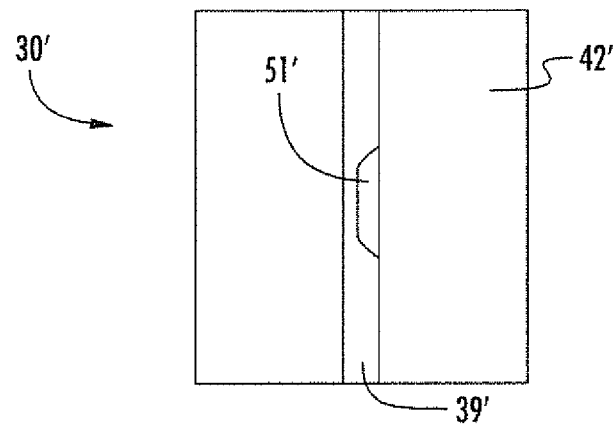
FIGS. 10-12 are bottom, side, and top views, respectively, of the mounting bracket of FIG. 2.
Figure 11:
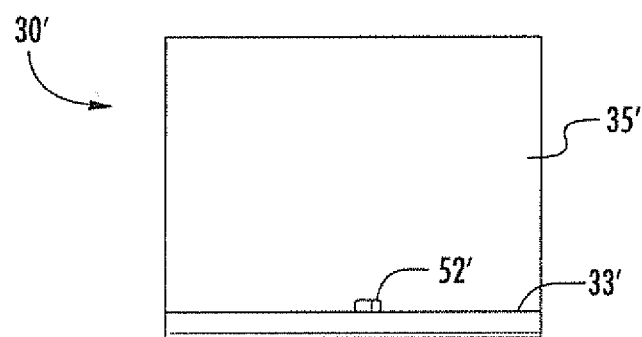
Figure 12:
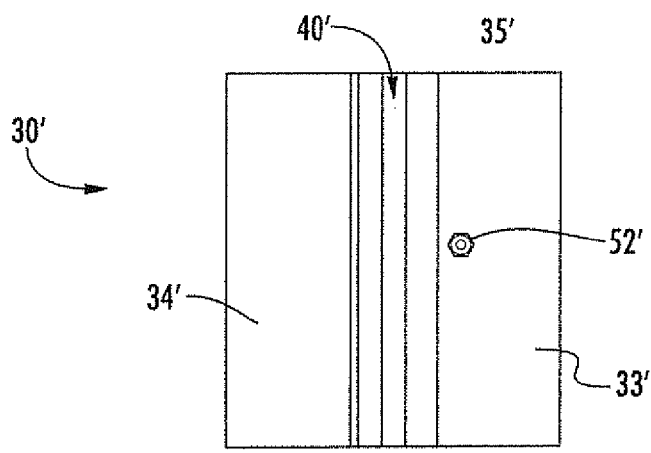
Figure 13:
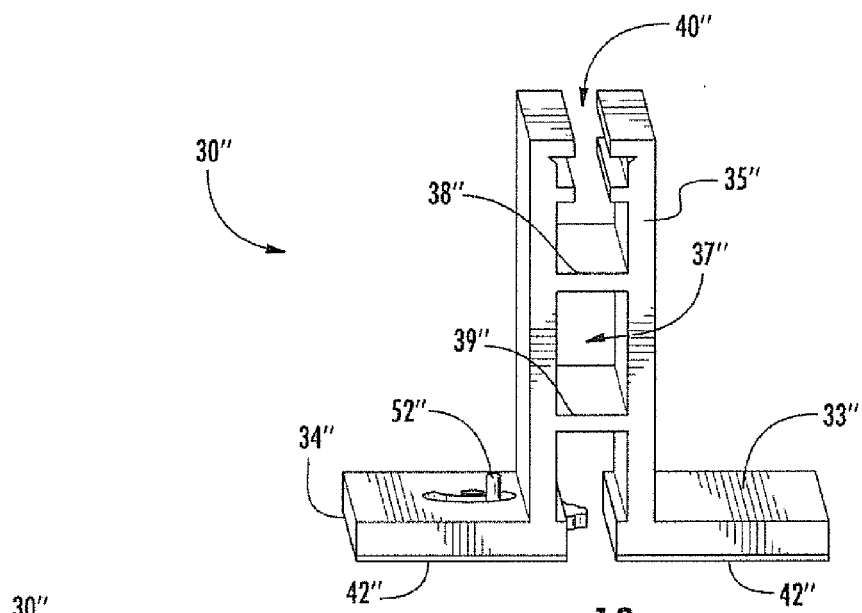
FIGS. 13-15 are perspective end, bottom, and cutaway end views, respectively, of the mounting bracket of FIG. 3.
Figure 14:
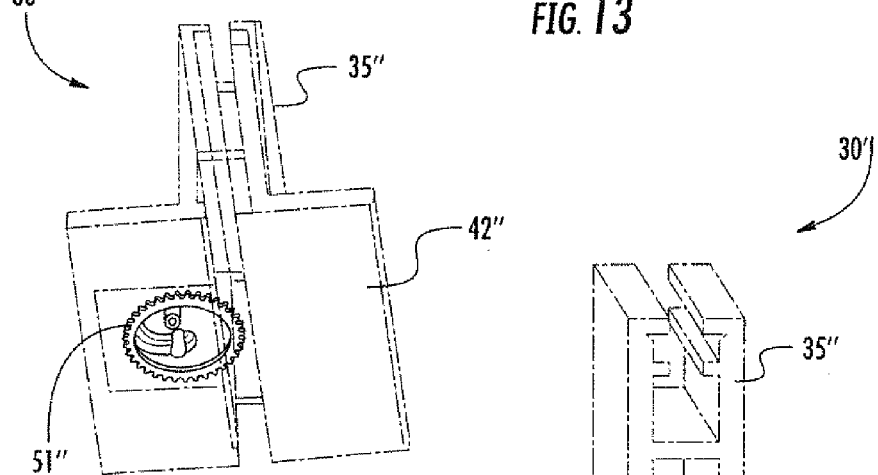
Figure 15:
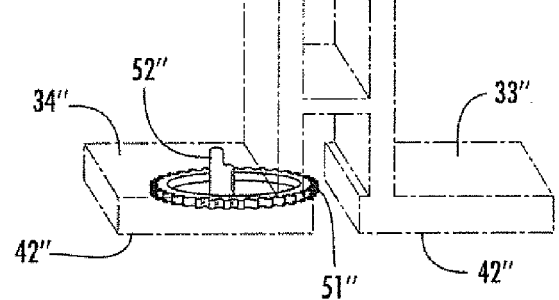

In the example illustrated in FIGS. 7-9, the mounting brackets 30 are coupled with solar modules 45 via the bolts 41, which screw downward through respective end and mid clamps 43, 44 into nuts (not shown) located in the top rails or fastener channels 40, as seen in FIGS. 7 and 8, for example. A first row of panels 45 may then be attached on the roof 31 by clamping to the existing standing seams 32 on standing seam metal roofs (as shown in FIGS. 4-6) for the mounting brackets 30. Again, an end-clamp 43 may be used as demonstrated in FIG. 7. A next row of modules may then be attached with additional mounting brackets 30 on the bottom of the second row modules with a mid-clamp 44, as shown in FIG. 8. It should be noted that different mounting brackets 30, 30', and 30" may be used during an installation, that this, not all of the same type of mounting bracket need by used in a given installation, but rather they may be intermixed. In the illustrated example, the end clamp 43 generally resembles stair steps, and the mid clamp 44 generally resembles a "U" shape with outwardly extending flanges or arms, as shown, but other suitable clamp types and shapes may be used in different embodiments.

The above steps may be repeated for each row of modules 45 to be installed, until the last row of modules is in place. The last module 45 of each row may be attached to the mounting brackets 30 using end-clamps 43, as discussed above, or attached directly to the panels with a nut and bolt into the pre-existing manufacturer's mounting holes.

It should be noted that different shapes of the vertical extension portions 35, 35', 35" beside a rectangular shape may also be used in some embodiments. By way of example, the mounting brackets 30, 30', and 30" may be formed out of a metal, such as by extruding aluminum into a beam having the illustrated cross section, and cutting the beam up into desired lengths (e.g., 3-6 inches, although other lengths may be used in different embodiments). However, other suitable materials may also be used in different embodiments (e.g., plastic, etc.). Moreover, the mounting brackets 30, 30', 30" need not be formed as an integral unit or unitary body (e.g., by extrusion), as the various components thereof may be separately formed and connected together in some embodiments. The various locking mechanisms described above may also be made of metal components, such as stainless steel, aluminum, etc. It should also be noted that the above-described mounting brackets 30, 30', 30" may be used with a variety of standing seam profiles.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for mounting at least one solar panel on a roof having standing seams protruding outwardly therefrom, the system comprising:
    a plurality of panel mounting brackets each comprising
        first and second flanges laterally spaced apart to define a seam channel therebetween, the seam channel for receiving a given standing seam therein when the first and second flanges are positioned on the roof straddling the given standing seam, and
        a vertical extension portion comprising first and second vertical sidewalls each respectively connected to said first and second flanges, with the first and second flanges extending laterally outward from the first and second vertical sidewalls; and
    a plurality of clamps each configured to couple said vertical extension portion of a respective panel mounting bracket with the at least one solar panel.

2. The system of claim 1 wherein the seam channel extends vertically into said vertical extension portion between the first and second sidewalls.

3. The system of claim 2 further comprising at least one adjustable locking mechanism carried by said vertical extension portion for contacting the given standing seam within the seam channel.

4. The system of claim 3 wherein said at least one adjustable locking mechanism comprises at least one set screw.

5. The system of claim 1 further comprising at least one locking mechanism carried by said first flange for contacting the given standing seam within the seam channel.

6. The system of claim 5 wherein said at least one adjustable locking mechanism comprises at least one locking cam.

7. The system of claim 1 wherein the at least one solar panel comprises a pair of solar panels; and wherein at least one of said clamps is configured to couple the pair of solar panels to a same vertical extension portion.

8. The system of claim 1 wherein each vertical extension portion defines a fastener channel therein between the first and second vertical sidewalls; and further comprising a respective fastener to be received within each fastener channel to couple each vertical extension portion with a respective clamp.

9. The system of claim 1 wherein the vertical extension portion has at least one hollow channel therein between the first and second vertical sidewalls.

10. The system of claim 1 wherein said vertical extension portion is coupled to upper surfaces of said first and second flanges; and further comprising a respective pad coupled to bottom surfaces of each of said first and second flanges opposite the upper surfaces.

11. A panel mounting bracket for mounting at least one solar panel on a roof having standing seams protruding outwardly therefrom, the panel mounting bracket comprising:
    first and second flanges laterally spaced apart to define a seam channel therebetween, the seam channel for receiving a given standing seam therein when the first and second flanges are positioned on the roof straddling the given standing seam; and
    a vertical extension portion comprising first and second vertical sidewalls each respectively connected to said first and second flanges, the vertical extension portion to be coupled with the at least one solar panel, and the first and second flanges extending laterally outward from the first and second vertical sidewalls.

12. The panel mounting bracket of claim 11 wherein the seam channel extends vertically into said vertical extension portion between the first and second sidewalls.

13. The panel mounting bracket of claim 12 further comprising at least one adjustable locking mechanism carried by said vertical extension portion for contacting the given standing seam within the seam channel.

14. The panel mounting bracket of claim 13 wherein said at least one adjustable locking mechanism comprises at least one set screw.

15. The panel mounting bracket of claim 11 further comprising at least one locking mechanism carried by said first flange for contacting the given standing seam within the seam channel.

16. The panel mounting bracket of claim 15 wherein said at least one adjustable locking mechanism comprises at least one locking cam.

17. The panel mounting bracket of claim 11 wherein each vertical extension portion defines a fastener channel therein between the first and second vertical sidewalls.

18. The panel mounting bracket of claim 11 wherein the vertical extension portion has at least one hollow channel therein between the first and second vertical sidewalls.

19. A method for mounting at least one solar panel on a roof having standing seams protruding outwardly therefrom, the method comprising:
    positioning a plurality of panel mounting brackets on the roof overlapping the standing seams, each panel mounting bracket comprising
        first and second flanges laterally spaced apart to define a seam channel therebetween, the seam channel for receiving a given standing seam therein when the first and second flanges are positioned on the roof straddling the given standing seam, and
        a vertical extension portion comprising first and second vertical sidewalls each respectively connected to the first and second flanges, with the first and second flanges extending laterally outward from the first and second vertical sidewalls; and
    coupling the vertical extension portion of each panel mounting bracket with the at least one solar panel using a respective clamp.

20. The method of claim 19 wherein the seam channel extends vertically into the vertical extension portion between the first and second sidewalls.

21. The method of claim 20 wherein positioning comprises adjusting at least one adjustable locking mechanism carried by the vertical extension portion to contact the given standing seam within the seam channel.

22. The method of claim 21 wherein the at least one adjustable locking mechanism comprises at least one set screw.

23. The method of claim 19 wherein positioning comprises adjusting at least one adjustable locking mechanism carried by the first flange to contact the given standing seam within the seam channel.

24. The method of claim 23 wherein the at least one adjustable locking mechanism comprises at least one locking cam.

* * * * *